(12) United States Patent
Lavoie et al.

(10) Patent No.: US 10,399,562 B2
(45) Date of Patent: Sep. 3, 2019

(54) PARK ASSIST WITH TIRE RADIUS CONSIDERATION

(71) Applicant: FORD GLOBAL TECHNOLOGIES, LLC, Dearborn, MI (US)

(72) Inventors: Erick Michael Lavoie, Dearborn, MI (US); Kerem Bayar, Ann Arbor, MI (US); Michael Edward Brewer, Dexter, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 220 days.

(21) Appl. No.: 15/626,909

(22) Filed: Jun. 19, 2017

(65) Prior Publication Data
US 2017/0282914 A1 Oct. 5, 2017

Related U.S. Application Data

(62) Division of application No. 14/637,440, filed on Mar. 4, 2015, now Pat. No. 9,714,031.

(51) Int. Cl.
*B60W 30/06* (2006.01)
*B60W 10/20* (2006.01)
(Continued)

(52) U.S. Cl.
CPC ............ *B60W 30/06* (2013.01); *B60W 10/04* (2013.01); *B60W 10/20* (2013.01); *G01S 19/49* (2013.01); *G01S 19/52* (2013.01); *B60W 2510/20* (2013.01); *B60W 2520/10* (2013.01); *B60W 2520/12* (2013.01); *B60W 2520/14* (2013.01); *B60W 2520/28* (2013.01); *B60W 2520/30* (2013.01); *B60W 2710/20* (2013.01); *B60W 2720/10* (2013.01)

(58) Field of Classification Search
CPC ...... B60W 10/04; B60W 10/20; B60W 30/06; B60W 2510/20; B60W 2520/10; B60W 2520/12; B60W 2520/14; B60W 2520/28; B60W 2520/30; B60W 2530/20; B60W 2710/20; B60W 2720/10; B60W 2720/24; G01S 19/49; G01S 19/52; B62D 15/025; B62D 15/026–0285
See application file for complete search history.

(56) References Cited

U.S. PATENT DOCUMENTS 7,706,943 B2 4/2010 Shimazaki
8,169,341 B2 5/2012 Toledo et al.
(Continued)

FOREIGN PATENT DOCUMENTS

DE 10-2010-000867 A1 7/2011
DE 10-2012-000213 A1 7/2013
(Continued)

*Primary Examiner* — Bao Long T Nguyen
(74) *Attorney, Agent, or Firm* — Frank Lollo; Brooks Kushman P.C.

(57) ABSTRACT

A vehicle, a vehicle parking assist system, and a parking method, is provided. A powertrain and a steering system may be operated to guide the vehicle into a parking location to complete a drive cycle based on a default tire radius, a tire angular velocity acquired during a drive cycle in response to a steering angle of the steering system exceeding a threshold value, and wheel and GPS vehicle speeds for the drive cycle.

16 Claims, 3 Drawing Sheets

(51) Int. Cl.
*B60W 10/04* (2006.01)
*G01S 19/52* (2010.01)
*G01S 19/49* (2010.01)

(56) References Cited

U.S. PATENT DOCUMENTS

| | | | |
|---|---|---|---|
| 9,002,564 B2 | 4/2015 | Shaffer et al. | |
| 2004/0204807 A1* | 10/2004 | Kimura | B62D 15/028 |
| | | | 701/36 |
| 2004/0267420 A1* | 12/2004 | Tanaka | B62D 15/027 |
| | | | 701/36 |
| 2007/0288142 A1* | 12/2007 | Maeda | B62D 1/286 |
| | | | 701/41 |
| 2011/0137524 A1* | 6/2011 | Kim | B62D 15/0285 |
| | | | 701/42 |
| 2011/0199236 A1* | 8/2011 | Hauber | B62D 15/027 |
| | | | 340/932.2 |
| 2011/0260887 A1 | 10/2011 | Toledo et al. | |
| 2012/0004809 A1 | 1/2012 | Sasajima | |
| 2012/0016555 A1* | 1/2012 | Ghneim | B62D 15/0275 |
| | | | 701/41 |
| 2014/0088832 A1 | 3/2014 | Bauer | |
| 2016/0046324 A1 | 2/2016 | Yu | |
| 2017/0129486 A1* | 5/2017 | Nakada | B60W 30/06 |

FOREIGN PATENT DOCUMENTS

| | | |
|---|---|---|
| DE | 10-2012-018409 A1 | 3/2014 |
| DE | 10-2012-219569 A1 | 4/2014 |
| JP | 2008-241462 A | 10/2008 |
| KR | 10-2013-0128892 A | 11/2013 |

* cited by examiner

PARK ASSIST WITH TIRE RADIUS CONSIDERATION

REFERENCE TO RELATED APPLICATION

This application is a division of U.S. application Ser. No. 14/637,440 filed Mar. 4, 2015, now U.S. Pat. No. 9,714,031, issued Jul. 25, 2017, the disclosure of which is hereby incorporated in its entirety by reference herein.

TECHNICAL FIELD

This disclosure relates to vehicle park assist strategies that consider tire radius.

BACKGROUND

Vehicles may be provided with a parking assist system. The parking assist system may be configured to identify obstacles and register the distance between the obstacles and the vehicle as well as identifying a parking spot. The parking assist system may assist a driver in moving the vehicle towards the identified parking spot while avoiding the obstacles.

SUMMARY

In at least one embodiment, a vehicle is provided. The vehicle may include a powertrain, a steering system, and a controller. The controller may be programmed to operate the powertrain and steering system to guide the vehicle into a parking location to complete a drive cycle. The vehicle may be guided into the parking location based on a default tire radius, a tire angular velocity acquired during the drive cycle in response to a steering angle of the steering system exceeding a threshold value, and wheel and GPS vehicle speeds for the drive cycle.

In at least one embodiment, a vehicle is provided. The vehicle may include an engine, a steering system, a parking sensor, and a controller. The parking sensor may be configured to identify a parking location relative to a curb. The controller may be programmed to operate the engine and the steering system to guide the vehicle into the parking location in response to a park assist request. The vehicle may be guided based on a yaw rate, GPS vehicle speed, wheel speed, and initial tire radius such that changes in tire radius away from the initial tire radius do not cause a distance between the parked location and the curb to be greater than a predetermined threshold distance.

In at least one embodiment, a vehicle is provided. The vehicle includes a controller configured to operate a steering system to guide the vehicle into a parked position relative to a curb to complete a drive cycle. The vehicle may be guided based on a yaw rate, GPS vehicle speed, wheel speed, track width, and default tire radius such that changes in tire radius away from the default tire radius during the drive cycle do not cause a distance between the parked position and the curb to be greater than a predetermined threshold distance.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
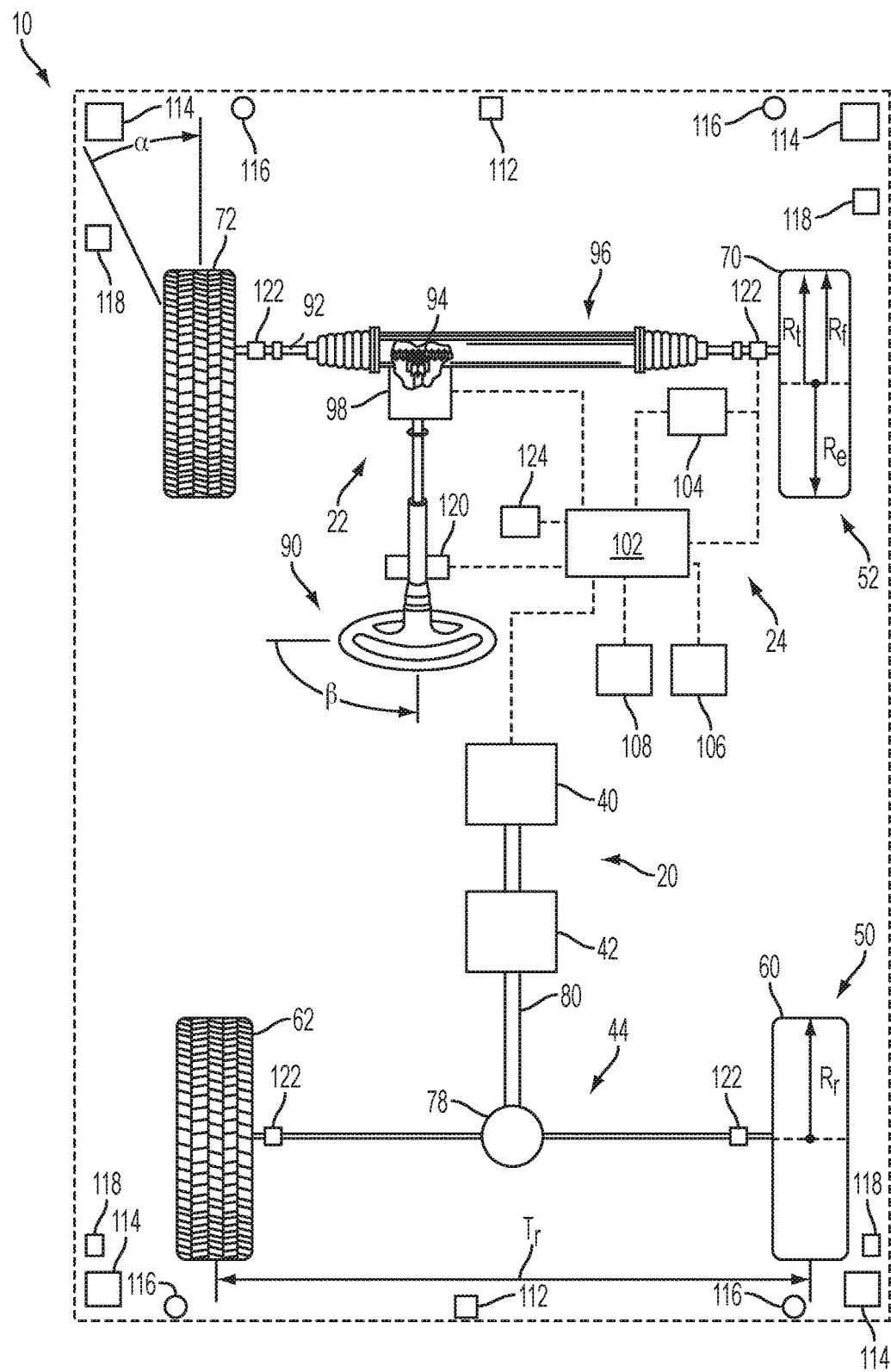
FIG. 1 is an exemplary embodiment of a vehicle having a parking assist system.

Referring to FIG. 1, a vehicle 10 may be provided. The vehicle 10 may be a motor vehicle such as an automobile, a truck, farm equipment, or military transport vehicle. The vehicle 10 may include a powertrain 20, a steering system 22, and a parking assist system 24.

The powertrain 20 may provide torque to one or more wheel assemblies to propel the vehicle 10. The powertrain 20 may have a hybrid configuration that may employ multiple power sources or a non-hybrid configuration. In a non-hybrid configuration the powertrain 20 may include an engine 40, a transmission 42, and at least one drive axle assembly 44.

The engine 40 may be configured as an internal combustion engine that may be adapted to operate using any suitable type of fuel, such as gasoline, diesel, ethanol, hydrogen, etc. The engine 40 may provide power or a propulsive torque that may be used to rotate one or more wheel assemblies to propel the vehicle 10. For example, the vehicle 10 may have a first wheel assembly 50 and a second wheel assembly 52 longitudinally spaced apart from the first wheel assembly 50. Commonly the first wheel assembly 50 may be referred to as a rear axle and the second wheel assembly 52 may be referred to as a front axle.

The first wheel assembly 50 may include a first tire 60 mounted on a first wheel. The first wheel assembly 50 may include a second tire 62 mounted on a second wheel laterally spaced apart from the first tire 60 mounted on the first wheel. The combination of the first tire 60 and the first wheel may be rotatably mounted to a vehicle chassis by a wheel hub assembly.

The second wheel assembly 52 may include a first tire 70 mounted on a first wheel. The second wheel assembly 52 may include a second tire 72 mounted on a second wheel laterally spaced apart from the first tire 70. The combination of the first tire 70 and the first wheel may be rotatably mounted to a vehicle chassis by a wheel hub assembly.

The transmission 42 may be coupled or drivably connected to the engine 40. The transmission 42 may be of any suitable type such as an automatic or manual multi-gear or step ratio transmission. As used herein, the term transmission may include a transfer case or differential 78. The differential 78 may provide multi-wheel drive, all-wheel drive, front wheel drive, or rear wheel drive capability.

The drive axle assembly 44 may rotatably support the first wheel assembly 50. An output of the transmission 42 may be connected to an input of the differential 78 operably connected to the drive axle assembly 44 with a driveshaft 80. In at least one embodiment, the vehicle 10 may be provided with a forward drive axle assembly that may rotatably support the second wheel assembly 52.

The steering system 22 may be configured to articulate or pivot the second wheel assembly 52. The steering system 22 may include a steering wheel 90 in rotatable connection with the second wheel assembly 52 through a steering linkage 92. The steering linkage 92 may be configured to pivot the first wheel and the second wheel of the second wheel assembly 52 about a kingpin axis to vary a pivotal position of the wheels of the second wheel assembly 52.

The steering linkage 92 may be coupled with a steering gearbox 94. The steering gearbox 94 may be coupled with a steering mechanism 96. The steering mechanism may be connected to the first and second wheels of the second wheel assembly 52. The steering mechanism 96 may be configured to pivot or articulate the first wheel and the second wheel of the second wheel assembly 52 about the kingpin axis responsive to the rotation of the steering wheel 90. The steering mechanism 96 may be a rack and pinion steering mechanism, a recirculating ball steering mechanism, a worm and sector steering mechanism, variable ratio steering mechanism, electric power assisted steering, or other configuration that may pivot or articulate vehicle wheels. The pivotal position of the second wheel assembly 52 may be shown as a wheel angle position α and the corresponding rotational position of the steering wheel 90 may be shown as a steering wheel angle position β.

A power steering motor 98 may be coupled with the steering linkage 92 and/or the steering gearbox 94. The power steering motor 98 may be configured to impart motion or apply torque to the steering system 22 to turn the second wheel assembly 52. The power steering motor 98 may be an electronic power assist motor configured to provide assistance to aid the driver in turning the second wheel assembly 52 responsive to the turning of the steering wheel 90. In at least one embodiment, the parking assist system 24 may be configured to execute an auto park event, in which the power steering motor 98 turns the second wheel assembly 52 while the parking assist system 24 affects operation of the powertrain 20 to perform a parking event with or without driver intervention.

The powertrain 20 and the steering system 22 may be in communication with the parking assist system 24. The parking assist system 24 may assist an operator of the vehicle 10 in overcoming potential challenges associated with parking. The parking assist system 24 may assist an operator of the vehicle in performing parallel, perpendicular, or other parking maneuvers to guide the vehicle 10 into an identified parking location.

The parking assist system 24 may be operated by a controller 102 in communication with a plurality of vehicle sensors. In at least one embodiment, the controller 102 may be configured as at least one processor associated with an antilock braking system module (ABS) 104 or a body control module (BCM) 106, or a separate and distinct parking module. In at least one embodiment, the controller 102 may be in communication with the ABS 104 and/or the BCM 106.

The plurality of vehicle sensors may include a camera 112, a parking sensor 114, a proximity sensor 116, a side looking sensor 118, a steering sensor 120, a tire pressure sensor, and a wheel speed sensor 122. The controller 102 may be in communication with the plurality of sensors via wired connections, wireless connections or may be in communication with the plurality of sensors through a CAN BUS Network.

The camera 112 may be a rear-looking camera configured to provide information, as to obstacles or objects aft of the vehicle 10, to the operator of the vehicle 10 via a human machine interface (HMI) 124 and/or the parking assist system 24. The camera 112 may be disposed proximate a rear portion of the vehicle 10. In at least one embodiment, the camera 112 may be a forward-looking camera configured to provide information, as to obstacles or objects forward of the vehicle 10, to the HMI 124 and/or the parking assist system 24. The HMI 124 may be a video display screen, or a combination audio-visual system.

The parking sensor 114, the proximity sensor 116, and the side looking sensor 118 may be sensors configured to identify a parking location. The parking sensor 114, the proximity sensor 116, and/or the side looking sensor 118 may be ultrasonic sensors including a transmitter and a receiver. The parking sensor 114, the proximity sensor 116, and/or the side looking sensor 118 may be at least one of a radar, LIDAR, optical sensor or the like. A combination of the parking sensor 114, the proximity sensor 116, and or the side looking sensor 118 may be disposed proximate each corner of the vehicle 10. These sensors may be disposed such that the sensors may provide full or nearly full sensory coverage about the vehicle 10. For example, the sensors may be disposed proximate the front and rear bumpers. The number, type, and or positioning of the plurality of sensors may vary based on the vehicle application.

The steering sensor 120 may be configured as a steering wheel angle sensor. The steering sensor 120 may be disposed proximate the steering wheel 90 or maybe disposed proximate the steering gearbox 94 or the steering mechanism 96. The steering sensor 120 may be configured to provide data indicative of steering wheel 90 rotation such as the steering wheel angle position β.

The wheel speed sensor 122 may be disposed proximate a vehicle wheel. For example, a wheel speed sensor 122 may be disposed proximate the first tire 60 and the second tire 62 of the first wheel assembly 50. A wheel speed sensor 122 may also be disposed proximate the first tire 70 and the second tire 72 of the second wheel assembly 52. The wheel speed sensor 122 may be configured to provide a rotational speed or angular velocity of the tire and respective wheel.

Figure 2:
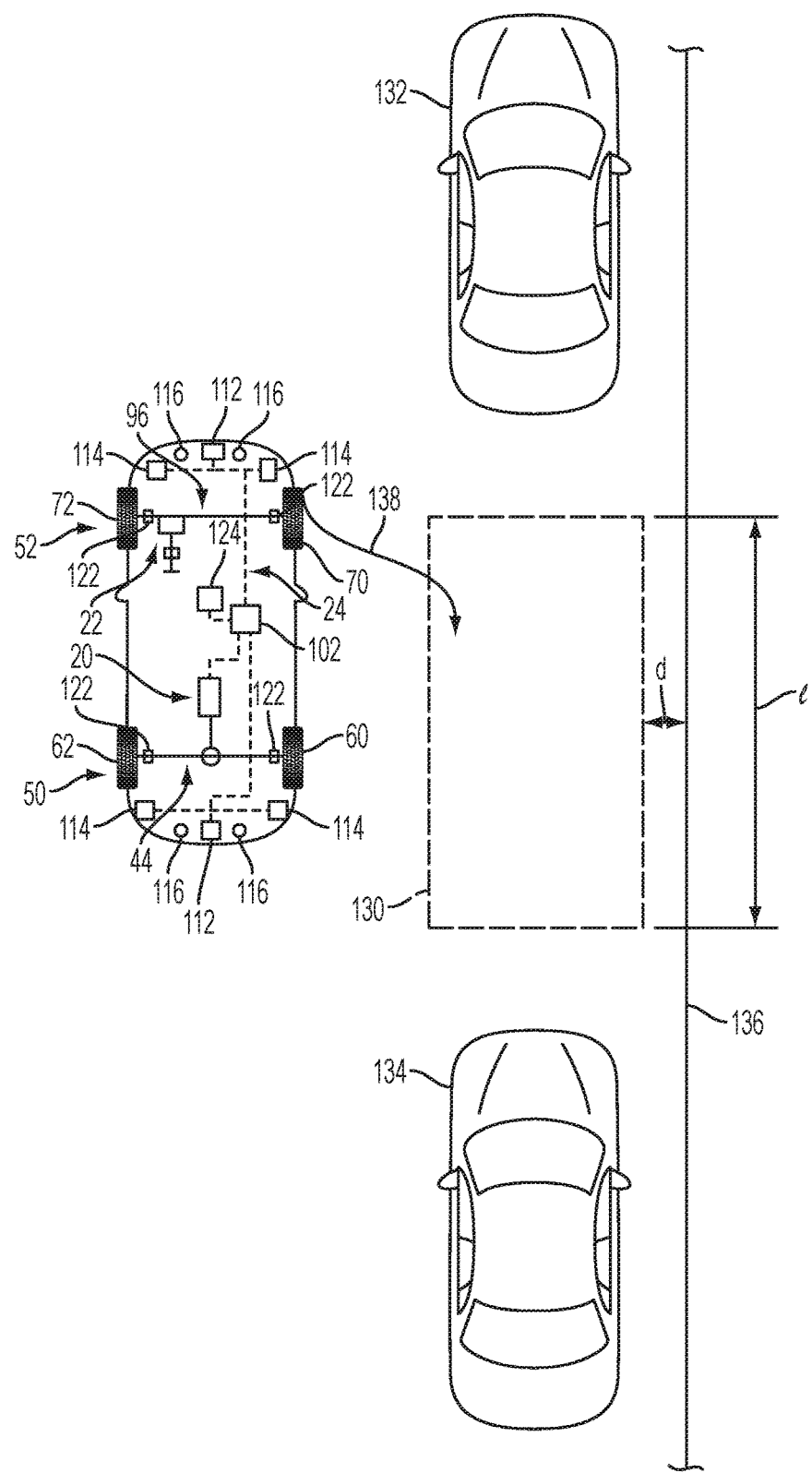
FIG. 2 is a perspective view of a vehicle proximate a parking location.

Referring to FIG. 2, a perspective view of a vehicle proximate a parking location is shown. An operator of the vehicle 10 may desire to park the vehicle 10 into a parked position within a parking location 130 identified by at least one of the camera 112, the parking sensor 114, the proximity sensor 116, and the side looking sensor 118. The parking location 130 may be defined by a first object 132, a second object 134, and a curb 136. The first object 132 may be a first parked car forward of the parking location 130. The second object 134 may be a second parked car aft of the parking location 130. The curb 136 may be adjacent the parking location, the first object 132, and the second object 134. The parking assist system 24 may be configured to determine a vehicle trajectory or calculate a guidance path 138 to guide the vehicle 10 within the parking location 130 relative to a combination of a first object 132, a second object 134, a curb 136, and parking location length, l.

The vehicle 10 may be maneuvered into the parking location 130 along the guidance path 138. The guidance path utilized by the parking assist system 24 may be calculated or determined by known techniques. Examples of such guidance path calculation techniques are shown in Toledo et al., U.S. Patent Publication No. 20110260887 A1 and Toledo et al., U.S. Pat. No. 8,169,341 B2, the contents of each of which is hereby incorporated by reference in its entirety. The parking maneuver may include the parking assist system 24 affecting operation of the powertrain 20 and the steering system 22 to move the vehicle 10 from a stop into the parking location 130. The parking maneuver may further include moving the vehicle 10 within the parking location 130 and subsequently stopping the vehicle defining the parked position relative to the curb 136.

The parking assist system 24 may attempt to park the vehicle 10 within a predetermined threshold distance from the curb 136. For example, the predetermined threshold distance from the curb 136 may be a distance such as 30 cm to meet customer expectations. The parking assist system 24 may take into account a radius of at least one tire associated with the first and second wheel assemblies 50, 52. Changes in tire radius may affect the parking assist system 24 in guiding the vehicle 10 to be within the predetermined threshold distance from the curb 136.

Changes in tire radius may result from tire wear, changes in tire air pressure, replacement of a tire with a spare tire, tire defects, or other issues that may affect tire radius. These changes in the tire radius may place the vehicle 10 in a parked position or parked location not within the predetermined threshold distance from the curb 136 or impacting or traversing the curb 136 to complete a drive cycle. Current methods to estimate the tire radius may be unable to estimate the tire radius without the vehicle 10 being operated for a predetermined period of time or achieve a predetermined travel distance before the estimate of tire radius may be taken. In an effort to improve tire radius estimations or tire circumference estimations, the parking assist system 24 may use a fusion of multiple methods including yaw rate sensing, relative learning, and GPS learning. The methods may be employed in parallel, or sequentially and iteratively to provide an accurate estimate of tire radii or tire circumference during a drive cycle, compare the estimate of the tire radii or circumference during the current drive cycle and compare it to the tire radii or circumference from a preceding drive cycle, and update the parking assist system 24 with the radii or circumference from the current drive cycle. The tire radius or tire circumference estimate may also be provided to other vehicle systems, programs, or sub-routines that may be able to use the tire radius or circumference estimate, such as a distance traveled estimate or vehicle trajectory estimate.

The yaw rate sensing method may be configured to calculate a reference tire radius, Rr. The reference tire radius, Rr, may be the radius of at least one of the tires associated with the first wheel assembly 50 and the second wheel assembly 52. For example, the reference tire radius, Rr, may be the radius of the first tire 60 of the first wheel assembly 50 or the radius of the first tire 70 of the second wheel assembly 52. The reference tire radius, Rr, may be based on changes from an initial tire radius or default tire radius learned from a previous drive cycle stored in memory.

The yaw rate sensing method may then learn the radius of a tire laterally spaced apart from the reference tire disposed proximate the same axle during the current drive cycle. The yaw rate sensing method may then learn the remainder of the vehicle's tire radii via the relative learning method The yaw rate sensing method may be configured to relate a vehicle yaw rate, $\omega_z$, the reference tire speed, a tire speed of a tire spaced apart from the reference tire, and vehicle track width, Tr, to estimate the reference tire radius, Rr. The vehicle yaw rate, $\omega_z$, may be provided to the parking assist system 24 by the BCM 106 or by a vehicle restraint control module, or a stand alone yaw rate sensor.

The reference tire speed may be provided by a wheel speed sensor 122 disposed proximate the reference tire. The tire speed of a tire spaced apart from the reference tire may be provided by a wheel speed sensor 122 disposed proximate the tire. For example, the tire spaced apart from the reference tire may be the second tire 62 of the first wheel assembly 50 or may be at least one of the first tire 70 or the second tire 72 of the second wheel assembly 52.

The vehicle track width, Tr, may be a lateral distance between a centerline of the first tire 60 of the first wheel assembly 50 and the second tire 62 of the first wheel assembly 50. The vehicle track width, Tr, may be a lateral distance between a centerline of the first tire 70 of the second wheel assembly 52 and the second tire 72 of the second wheel assembly 52. The vehicle track width, Tr, may be a predetermined value programmed into the controller 102 and/or the parking assist system 24. In at least one embodiment, the vehicle track width, Tr, may be a vehicle half-track width, HTr. As the name implies the vehicle half-track width, HTr, may be one half of the vehicle track width, Tr.

The yaw rate sensing method may be employed responsive to the satisfaction of screening conditions. The screening conditions that may be met prior to employing the yaw rate sensing method may include a steering angle provided by the steering sensor 120 being greater than a threshold steering angle, a vehicle speed being less than a threshold vehicle speed, or a vehicle yaw rate, $\omega_z$, being greater than a threshold vehicle yaw rate. The screening conditions may be implemented to minimize errors in the tire radius learning methods. The parking assist system 24 may receive the reference tire radius, Rr, based on a measured steering angle, a vehicle yaw rate, $\omega_z$, a reference tire angular velocity, $\omega_R$, and a tire angular velocity, $\omega_T$.

The yaw rate sensing method may calculate the reference tire radius, Rr, based on Equation (1):

$$Rr = \frac{\omega z \cdot (2 \cdot HTr)}{\omega R - \gamma \cdot \omega T} \quad (1)$$

$\gamma$ may be a learned radius ratio learned during straight driving by the relative learning method. Instantaneous values of the reference tire radius, Rr, may be summed up and averaged. A final reference tire radius, Rr, may be updated periodically during the drive cycle. The relative learning method may be configured to calculate a first tire radius estimate, Rf. The parking assist system 24 may be configured to employ the relative learning method responsive to the vehicle 10 driving approximately in a straight line. The screening conditions that may be met prior to employing the relative learning method may include a steering angle provided by the steering sensor 120 being less than a threshold steering angle and a vehicle speed being greater than a threshold vehicle speed. The screening conditions may confirm that the vehicle is driving approximately straight with a low amount of wheel slip. The parking assist system 24 may receive the first tire radius estimate, Rf, based on the reference tire radius, Rr, or based on the reference tire angular velocity, $\omega_R$, and the tire angular velocity, $\omega_T$.

The relative learning method may calculate a percent difference in size of a tire radius, relative to the reference tire radius, Rr, during the current drive cycle. The relative learning method may calculate the percent difference in size based on Equation (2):

$$\% \text{ Difference} = \frac{\omega R - \omega T}{\omega T} \quad (2)$$

The instantaneous results of the percent difference in size may be summed up and averaged or filtered. A final value of the percent difference in size may be updated periodically during a drive cycle. The relative learning method may then determine the tire radius, Rt, based on the percent difference. The learned radius ratio, $\gamma$, may be calculated as a ratio between the tire radius, Rf, which may be laterally spaced apart from the reference tire, and the reference tire radius, Rr. The learned radius ratio, γ, may then be fed back into the yaw rate sensing method.

The GPS learning method may be configured to calculate a second tire radius estimate, Rt, during the current drive cycle. The GPS learning method may be employed responsive to the satisfaction of screening conditions. The screening conditions that may be met prior to employing the GPS learning method may include a vehicle speed being greater than a threshold vehicle speed, a steering angle being less than a threshold steering angle, a vehicle acceleration being less than a threshold vehicle acceleration, or a vehicle yaw rate being less than a threshold vehicle yaw rate. These screening conditions may indicate that the vehicle 10 is driving in a straight line. The parking assist system 24 may receive the second tire radius estimate, Rt, based on a GPS vehicle speed, a tire angular velocity, or a tire wheel slip estimate. The GPS vehicle speed may be a vehicle speed output from a GPS module 108 (Haversine Speed).

The GPS learning method may calculate the second tire radius estimate, Rt, based on Equation (3):

$$R_t = \frac{GPSspeed \cdot (s+1)}{\omega t} \quad (3)$$

Where ωt is an angular velocity of at least one of the first tire 60 and second tire 62 of the first wheel assembly 50 and the first tire 70 in the second tire 72 of the second wheel assembly 52. The angular velocity may be provided by a wheel speed sensor 122 disposed proximate the respective tire.

Where s is a wheel slip estimate of at least one tire calculated based on Equation (4):

$$s(x) = \frac{T_x}{r \cdot F \cdot C(\mu)} \quad (4)$$

Where T is the net wheel torque of at least one tire of the first wheel assembly 50 and the second wheel assembly 52.

Where r is a nominal tire radius of at least one of the vehicle tires stored in memory.

Where F is an estimated normal load applied to at least one of the vehicle tires.

Where C is a longitudinal stiffness of at least one of the vehicle tires as a function of an estimated coefficient of friction of the road surface, μ, and is assumed to be constant.

The GPS vehicle speed may experience delays during vehicle acceleration and deceleration events. The delay may be compensated for by the parking assist system 24 to avoid tire radius estimation error. The delay may be compensated for by implementing an interpolation method between two consecutive speed readings by keeping the previous speed reading from a previous iteration in memory, e.g., EPROM.

The parking assist system 24 may compare the results of the reference tire radius, Rr, the first tire radius estimate, Rf, and the second tire radius estimate, Rt, to each other. The parking assist system 24 may pick at least one of the first tire radius estimate, Rf, and the second tire radius estimate, Rt, based on the maturity of the estimate. A mature estimate may be a tire radius estimate that was taken most recently in time or sampled over longer time periods during the drive cycle. In at least one embodiment, the first tire radius estimate, Rf, may be fused with the second tire radius estimate, Rt, according to a least-squares method or other statistical method to provide a tire radius estimate, Re, that the parking assist system 24 may be updated with.

The parking assist system 24 may compare a relative difference between a default (reference) tire radius stored into memory or the reference tire radius and at least one of the first tire radius estimate, Rf, and the second tire radius estimate, Rt. The parking assist system 24 may update a guidance path algorithm with the tire radius estimate, Re, or the relative difference if the relative difference is greater than a relative difference threshold. The update of the guidance path algorithm may enable the parking assist system 24 to guide the vehicle 10 into a parked position within an identified parking location 130 relative to the curb 136 to complete the drive cycle such that changes in a tire radius away from the reference tire radius, Rr, do not cause a distance, d, between the parked position in the curb 136 to be greater than the predetermined threshold distance.

Figure 3:
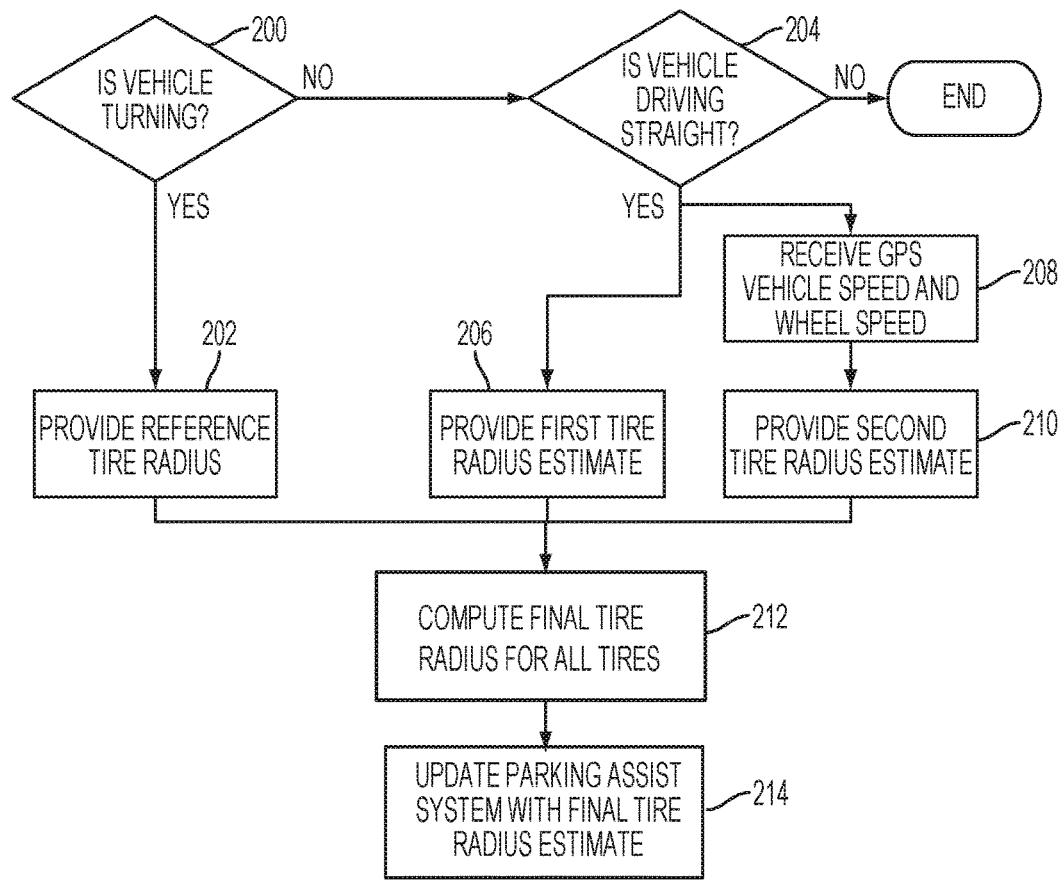
FIG. 3 is flow chart of an exemplary parking method.

Referring to FIG. 3, an exemplary parking method is shown. The method may receive a steering angle from the steering sensor 120 and a wheel speed from the wheel speed sensor 122 or a vehicle speed from the ABS 104 or BCM 106. At block 200, the method may determine if the vehicle 10 is turning. The vehicle 10 may be turning if the steering angle is greater than a steering angle threshold and the vehicle speed is less than a vehicle speed threshold. If the vehicle 10 is turning, the method may continue to block 202.

At block 202, the method may provide a reference tire radius, Rr. The reference tire radius, Rr, may be based on a reference tire angular velocity, ωr, a vehicle track width, Tr, and a vehicle yaw rate, ωz. In at least one embodiment, the reference tire radius, Rr, may be based on the vehicle steering angle, a reference tire angular velocity, ωr, and a tire angular velocity, ωt, of a tire spaced apart from the reference tire.

Should the vehicle 10 not be turning at block 200, the method may continue to block 204. The vehicle 10 may not be turning if both the steering angle is less than the steering angle threshold and the vehicle speed is greater than the vehicle speed threshold. If the vehicle 10 is not turning, the method may continue to blocks 206 and 208. Should both the steering angle not be less than the steering angle threshold and the vehicle speed not be greater than the vehicle speed threshold, the method may end.

Referring to block 204, if the vehicle is driving in a straight line, the method may in parallel proceed to blocks 206 and 208. At block 206, the method may provide a first tire radius estimate, Rf. The first tire radius estimate, Rf, may be based on the reference tire radius, Rr, the tire angular velocity, ωt, of the tire spaced apart from the reference tire, and the vehicle track width, Tr. At block 208, the method may receive at least one of a vehicle speed output from a GPS module 108 and a wheel speed output by a wheel speed sensor 122. At block 210 the method may provide a second tire radius estimate, Rt. The second tire radius estimate, Rt, may be based on the wheel speed output by the wheel speed sensor 122, the vehicle speed output from the GPS module 108, a net wheel torque, T, the tire angular velocity, ωt, of a tire spaced apart from the reference tire, and a tire slip estimate, s.

At block 212, the method may estimate all four tire radii and store the estimates in memory. The method may perform multiple iterations to learn each radius of the tire using the above described learning methods. For example, the method may learn all tire radii using the GPS learning method. The method may learn a tire radius of a tire laterally spaced apart from the reference tire using the yaw rate sensing method. The method may learn the tire radii of tires longitudinally spaced apart from and disposed on a different axle than the reference tire using the relative learning method.

At block 214, the method may update the parking assist system with a final tire radius estimate for each tire of the vehicle. The final tire radius estimate may be based on a fusion on at least one of the tire radius estimates provided by the GPS learning method, the yaw rate sensing method, and the relative learning method. The parking assist system 24 may update a parking guidance algorithm with the final tire radius estimate for all tires. The parking assist system 24 in response to identifying a parking location 130, may guide the vehicle 10 along a guidance path 138 into a parked position relative to the parking location 130 and to the curb 136. The vehicle 10 may be guided into the parking location 130 where the guidance path 138 may be based on the parking guidance algorithm to complete the drive cycle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
a powertrain;
a steering system; and
a controller programmed to, in response to a steering angle of the steering system exceeding a threshold value, operate the powertrain and the steering system to guide the vehicle into a parking location to complete a drive cycle based on a default tire radius, a tire angular velocity acquired during the drive cycle, a wheel speed, and a global positioning system (GPS) vehicle speed for the drive cycle.

2. The vehicle of claim 1 farther comprising:
a wheel speed sensor disposed proximate a tire spaced apart from a default tire; and
a parking sensor configured to identify the parking location, wherein the controller is further programmed to provide the default tire radius prior to the parking sensor identifying the parking location, and Wherein the default tire radius is based on a yaw rate, a track width, and the tire angular velocity.

3. The vehicle of claim 2 wherein the controller is further programmed to guide the vehicle into the parking location further based on the dethult tire radius and a tire angular velocity of the tire spaced apart from the default tire.

4. The vehicle of claim 3 wherein the controller is further programmed to guide the vehicle into the parking location based on the GPS vehicle speed, the tire angular velocity acquired during the drive cycle, the tire angular velocity of the tire spaced apart from the default tire, and a wheel slip estimate.

5. A vehicle comprising:
an engine;
a steering system;
a parking sensor configured to identify a parking location for a vehicle relative to a curb; and
a controller programmed to, in response to a park assist request, operate the engine and the steering system to guide the vehicle into the parking location based on a yaw rate, GPS vehicle speed, wheel speed, and initial tire radius such that changes in tire radius away from the initial tire radius during a preceding drive cycle do not cause a distance between a parked location of the vehicle and the curb to be greater than a predetermined threshold distance.

6. The vehicle of claim 5 wherein the initial tire radius is associated with a reference tire disposed proximate a rear axle of the vehicle.

7. The vehicle of claim 6 wherein the changes in tire radius away from the initial tire radius are based on the initial tire radius, and first and second tire radius estimates associated with a tire laterally spaced apart from the reference tire.

8. The vehicle of claim 7 wherein the initial tire radius is based on an angular velocity of the reference tire, a vehicle track width, and the yaw rate.

9. The vehicle of claim 8 wherein the first tire radius estimate is based on the initial tire radius, an angular velocity of the tire laterally spaced apart from the reference tire, and the vehicle track width.

10. The vehicle of claim 8 wherein the second tire radius estimate is based on the wheel speed, the GPS vehicle speed, and a net wheel torque.

11. A vehicle comprising:
a controller programmed to operate a steering system to guide the vehicle into a parked position relative to a curb based on a yaw rate, GPS vehicle speed, wheel speed, track width, and default tire radius such that changes in tire radius away from the default tire radius during a drive cycle do not cause a distance between the parked position and the curb to be greater than a predetermined threshold distance.

12. The vehicle of claim 11 wherein the default tire radius is associated with a reference tire disposed proximate a rear axle of the vehicle.

13. The vehicle of claim 12 wherein the changes in tire radius away from the default tire radius are based on the default tire radius, and first and second tire radius estimates associated with a tire spaced apart from the reference tire.

14. The vehicle of claim 13 wherein the first tire radius estimate is based on the default tire radius, an angular velocity of the tire spaced apart from the reference tire, and the track width.

15. The vehicle of claim 13 wherein the second tire radius estimate is based on the wheel speed, the GPS vehicle speed, and a net wheel torque.

16. The vehicle of claim 12 wherein the default tire radius is based on an angular velocity of the reference tire, the track width, and the yaw rate.

* * * * *